United States Patent
Baumann et al.

(10) Patent No.: US 12,042,021 B2
(45) Date of Patent: Jul. 23, 2024

(54) METHOD FOR AUTOMATICALLY FITTING A SHOE UPPER ONTO A LAST

(71) Applicant: KUKA Deutschland GmbH, Augsburg (DE)

(72) Inventors: Benjamin Baumann, Augsburg (DE); Johannes Landherr, Augsburg (DE)

(73) Assignee: KUKA Deutschland GmbH (DE)

( * ) Notice: Subject to any disclaimer, the term of this patent is extended or adjusted under 35 U.S.C. 154(b) by 315 days.

(21) Appl. No.: 17/433,385

(22) PCT Filed: Jan. 30, 2020

(86) PCT No.: PCT/EP2020/052254
§ 371 (c)(1),
(2) Date: Aug. 24, 2021

(87) PCT Pub. No.: WO2020/173653
PCT Pub. Date: Sep. 3, 2020

(65) Prior Publication Data
US 2022/0142305 A1    May 12, 2022

(30) Foreign Application Priority Data
Feb. 25, 2019   (DE) ............... 10 2019 202 515.3

(51) Int. Cl.
*A43D 13/00*   (2006.01)
*A43D 21/00*   (2006.01)
(Continued)

(52) U.S. Cl.
CPC .............. *A43D 13/00* (2013.01); *A43D 21/00* (2013.01); *A43D 21/02* (2013.01); *A43D 21/08* (2013.01);
(Continued)

(58) Field of Classification Search
CPC ........ A43D 21/00; A43D 21/02; A43D 21/08; A43D 21/12; A43D 21/122; A43D 21/127;
(Continued)

(56) References Cited

U.S. PATENT DOCUMENTS 1,150,804 A * 8/1915 Ashton ................... A43D 3/12
                                                   12/15
2,716,763 A * 9/1955 Senfleben .............. A43B 13/34
                                                   12/1 B
(Continued)

FOREIGN PATENT DOCUMENTS

DE           35 38 721 C2    10/1989
DE    10 2009 049 776 A1     6/2010
(Continued)

OTHER PUBLICATIONS

EP1103199 English Translation (Year: 2001).*
(Continued)

*Primary Examiner* — Timothy K Trieu
*Assistant Examiner* — Dakota Marin
(74) *Attorney, Agent, or Firm* — Dorton & Willis, LLP (57) ABSTRACT

A method for automatically pulling a shoe upper onto a last using a robot which includes a robot controller, a robot arm controlled automatically by the robot controller, and a gripper which is moved by the robot arm and which is designed to hold a shoe upper.

20 Claims, 5 Drawing Sheets

(51) Int. Cl.
*A43D 21/02* (2006.01)
*A43D 21/08* (2006.01)
*A43D 21/12* (2006.01)
*A43D 21/16* (2006.01)
*A43D 21/18* (2006.01)
*A43D 23/00* (2006.01)
*A43D 23/02* (2006.01)

(52) U.S. Cl.
CPC ............ *A43D 21/12* (2013.01); *A43D 21/122* (2013.01); *A43D 21/127* (2013.01); *A43D 21/16* (2013.01); *A43D 21/163* (2013.01); *A43D 21/166* (2013.01); *A43D 21/18* (2013.01); *A43D 23/00* (2013.01); *A43D 23/02* (2013.01); *A43D 23/022* (2013.01); *A43D 23/025* (2013.01); *A43D 23/027* (2013.01)

(58) Field of Classification Search
CPC .... A43D 21/16; A43D 21/163; A43D 21/166; A43D 21/18; A43D 23/00; A43D 23/02; A43D 23/022; A43D 23/025; A43D 23/027; A43D 13/00
USPC .............................................................. 12/15
See application file for complete search history.

(56) References Cited

U.S. PATENT DOCUMENTS

| | | | |
|---|---|---|---|
| 3,972,086 A * | 8/1976 | Belli | A43D 15/00 |
| | | | 12/7.9 |
| 4,315,341 A * | 2/1982 | Giebel | A43D 23/02 |
| | | | 12/10.5 |
| 4,671,755 A | 6/1987 | Graae et al. | |
| 9,565,902 B2 * | 2/2017 | Lu | A43D 11/12 |
| 9,856,106 B1 * | 1/2018 | Stewart | B65H 59/04 |
| 10,716,365 B2 * | 7/2020 | De Souza | A43D 21/003 |
| 11,246,378 B2 * | 2/2022 | Baptista De Souza | |
| | | | A43D 11/00 |
| 11,490,693 B2 * | 11/2022 | Chang | A43D 1/08 |
| 2006/0017195 A1 * | 1/2006 | Yang | B29D 35/146 |
| | | | 264/244 |
| 2013/0305465 A1 | 11/2013 | Siegismund | |
| 2018/0129185 A1 * | 5/2018 | Jurkovic | G05B 19/402 |
| 2018/0325219 A1 | 11/2018 | Jurkovic et al. | |
| 2019/0373987 A1 | 12/2019 | Manz et al. | |

FOREIGN PATENT DOCUMENTS

| | | | | |
|---|---|---|---|---|
| DE | 10 2011 009 641 B4 | 4/2013 | | |
| DE | 102013221020 A1 | 4/2015 | | |
| EP | 1103199 A1 * | 5/2001 | ............ | A43D 13/00 |
| JP | S5934604 U | 3/1984 | | |
| SU | 1192775 A1 | 11/1985 | | |
| WO | 2018154438 A1 | 8/2018 | | |

OTHER PUBLICATIONS

European Patent Office; Search Report in related International Patent Application No. PCT/EP2020/052254 dated Apr. 9, 2020; 6 pages.
German Patent Office; Search Report in related German Patent Application No. 10 2019 202 515.3 dated Oct. 23, 2019; 6 pages.

* cited by examiner

METHOD FOR AUTOMATICALLY FITTING A SHOE UPPER ONTO A LAST

CROSS-REFERENCE TO RELATED APPLICATIONS

This application is a national phase application under 35 U.S.C. § 371 of International Patent Application No. PCT/EP2020/052254, filed Jan. 30, 2020 (pending), which claims the benefit of priority to German Patent Application No. DE 10 2019 202 515.3, filed Feb. 25, 2019, the disclosures of which are incorporated by reference herein in their entirety.

TECHNICAL FIELD

The invention relates to a method for automatically pulling a shoe upper onto a last, by means of a robot which comprises a robot controller, a robot arm controlled automatically by the robot controller, and a gripper that is moved by the robot arm and is designed to hold a shoe upper.

BACKGROUND

A method is known from DE 10 2013 221 020 A1 for producing a shoe, which comprises the steps of providing a three-dimensionally preformed first shoe component, and processing the three-dimensionally preformed first shoe component, the processing step comprising an individually controllable sequence of processing steps.

The object of the invention is to create a method for automatically pulling a shoe upper onto a last by means of a robot.

SUMMARY

The object is achieved according to the invention by a method for automatically pulling a shoe upper onto a last by means of a robot, which comprises a robot controller, a robot arm controlled automatically by the robot controller, and a gripper moved by the robot arm, which is designed to hold a shoe upper, comprising the steps of:
 picking up the shoe upper, by means of the gripper guided by the robot arm, in such a way that the gripper holds the shoe upper in place,
 pulling the shoe upper held by the gripper onto the last, by means of a force/torque-controlled movement of the gripper by a motorized controlling of the joints of the robot arm, in such a way that the shoe upper is pulled onto the last in the direction of the heel end of the last, in the longitudinal extension of the last, starting at the toe end of the last, with a prespecified maximum pulling force, wherein
 the robot controller controls the joints of the robot arm in such a way that at least during a sub-portion of the pulling movement on the shoe upper in the longitudinal extension of the last, the shoe upper is pressed onto the last with a pressing force acting at least substantially perpendicularly on the sole surface of the last, and
 during the pulling movement and the pressing action of the shoe upper in the longitudinal extension of the last, the shoe upper is pulled onto the last in the longitudinal extension of the last, while preventing the creation and exertion of transverse forces through force/torque-controlled movement, until the heel part of the shoe upper slides past the transition edge of the sole surface of the last and over the heel surface of the last, and after the heel part of the shoe upper has slid past the transition edge of the last, the robot controller controls the joints of the robot arm in a modified manner, in such a way that the tensile force previously acting longitudinally from the toe end of the last towards the heel end of the last changes into a compressive force acting in the opposite direction, which presses the upper against the heel surface of the last, while at the same time the heel part of the shoe upper is pulled up along the heel end of the last until the shoe upper is completely seated on the last.

The invention addresses one aspect of the production of shoes, in particular sports shoes. The starting point of the method according to the invention is an existing, prefabricated shoe upper. A shoe upper is understood to mean the upper part of a shoe, that is to say in this respect the shoe without a sole. In this respect, the shoe upper comprises at least an outer upper, an inner upper, a front cap which defines the toe region, and a rear cap which defines the heel part. In this respect, the shoe upper can also already comprise a tab, i.e., tongue and optionally a tie, i.e., a lace or shoelace.

During the manufacture of a shoe, before a sole can be applied to the shoe upper, the shoe upper is generally pulled onto a last and the shoe upper is then provided with the sole while sitting on the last. For this purpose, the sole can be manufactured separately and, for example, glued to the underside of the shoe upper. Alternatively, the sole can be attached to the shoe upper by directly molding a (plastic) sole to it.

The invention addresses the partial process of automatically pulling the shoe upper onto a last, such that the shoe upper is prepared for the application of the sole in a step following the method according to the invention. The invention addresses the object of automatically carrying out the process of pulling the shoe upper onto a last by means of a robot. So that this succeeds, the invention describes individual steps that are necessary and/or advantageous so that the shoe upper comes to rest on the last in the correct position, without distortion and/or without tension, in the desired exact position after the process has been completed. It is also important that such precise positioning can be reproducible for a large number of shoe uppers of the same type, i.e., can be carried out automatically with repeat accuracy. The exact positioning, in particular a correctly positioned, distortion-free and/or tension-free positioning is important so that all manufactured shoes of one type of shoe look at least largely, or even exactly, the same, i.e. there are as little as possible, or no variations at all with regard to symmetry of the visual appearance and/or with regard to the internal shape.

The shoe upper can particularly be picked up automatically by the robot automatically grabbing a single, selected shoe upper by means of the gripper, for example from a storage container such as a box, wherein, for example, the robot controller is designed and configured, using sensors, to select a single shoe upper from among a plurality of shoe uppers present in a storage container, to determine its position and orientation in the storage container, and to grasp the selected shoe upper by means of the gripper by clamping, such that the shoe upper can be removed from the storage container by a movement of the robot arm. "Bin picking" strategy algorithms, known per se to a person skilled in the art, can be used for this purpose. In addition to the robot arm, the described gripper, and the described force/torque sensor, such a system can also comprise, for example, an optical sensor system, such as a camera, which works together with an image processing system.

A force/torque-controlled movement of the gripper can take place automatically, in particular by a force/torque sensor, particularly with multi-dimensional detection, being arranged between the flange of the robot arm and the gripper, which detects forces and/or torques acting on the gripper and/or transmitted from the gripper to the robot arm, and by these detected forces and/or torques being evaluated in particular by the robot controller, and by the movements of the gripper being moved by the robot arm as a function of the detected forces and/or torques. The force/torque sensor can comprise a single sensor which detects in multiple dimensions. Alternatively, the force/torque sensor can be formed from a group of several individual sensors, of which each individual sensor detects, for example, only a single force or a single torque in one dimension.

In an alternative embodiment, the method can also be carried out without a special, i.e., separate force/torque sensor, in particular if the robot arm itself is designed as a force/torque-controlled robot arm. For example, each joint of the robot arm can have its own force/torque sensor assigned to it, which in each case only detects the forces or the torque at this assigned joint of the robot arm. The robot controller can be configured to control the robot arm with an admittance control or with an impedance control.

The specified maximum tensile force is specified as a boundary value in the robot controller. The value of the prespecified maximum tensile force can depend on the structure of the shoe upper and/or the type of material and/or the material combination of the shoe upper. To this extent, a different maximum tensile force can be specified for each type of shoe upper. For example, when pulling on a shoe upper made of leather, higher maximum tensile forces can be allowed than is possible when pulling on a shoe upper made of a fabric, in particular a fabric that comprises elastic material.

According to the invention, it was found that the shoe upper comes to lie in the correct orientation on the last, free of distortion and/or free of tension, in the desired exact position, if at least during a sub-portion of the pulling movement of the shoe upper in the longitudinal extension of the last, the shoe upper is pressed onto the last with a pressing force which acts at least substantially perpendicularly on the sole surface of the last. Such a sub-portion of the pulling movement can in particular be the sub-portion during which the shoe upper is already approximately half-pulled onto the last, i.e., the forefoot of the last, but the shoe upper has not yet been pulled over the heel section of the last.

In order to additionally ensure the automatic, correctly oriented, distortion-free and/or tension-free pulling of the shoe upper onto the last, the invention also provides that, during the pulling and pressing of the shoe upper in the longitudinal extension of the last of the shoe upper, while preventing the creation and exertion of transverse forces, by force/torque-controlled movement, the shoe upper is pulled onto the last in the longitudinal extension of the last until the heel part of the shoe upper slides past the transition edge from the sole surface of the last to the heel surface of the last.

According to the invention, the creation of transverse forces should be understood to mean forces that arise or could arise due to the automatic pulling and/or sliding movement of the shoe upper along the last due to mutual contact, and which are to be at least largely avoided or even completely prevented.

According to the invention, the exertion of transverse forces should be understood to mean forces which are or could be transferred to the shoe upper due to active movements of the gripper due to joint movements of the robot arm, and which are to be at least largely avoided or even completely prevented.

In order to at least largely avoid or even completely prevent the creation and exertion of transverse forces, the robot arm and, with the robot arm, the gripper can perform certain compensatory movements in order to reduce or entirely negate, by the compensatory movements, any transverse forces in the process of arising.

According to the invention, transverse forces are those forces which, with respect to the longitudinal extension of the last, i.e., proceeding from the toe part of the last towards the heel part of the last, lie at least substantially or exactly in the plane of the sole surface of the last, but run in a substantially or exactly right-angled plane in the direction of the longitudinal extension of the last.

As soon as the heel part of the shoe upper is passed over the heel edge of the last, it is also provided according to the invention that the previous tensile force acting in the longitudinal direction from the toe end of the last in the direction of the heel end of the last is changed into a compressive force acting in the opposite direction, which pushes the shoe upper against the heel surface of the last, while at the same time the heel part of the shoe upper is pulled up along the heel end of the last until the shoe upper is completely seated on the last.

The decisive factor here is that, according to the invention, no tensile forces whatsoever are allowed to act in the longitudinal extension of the last while the heel part of the shoe upper is being pulled onto the heel surface of the last. According to the invention, it is expedient to change the previous tensile force to at least a slight compressive force. According to the invention, such a compressive force also favors the pulling of the heel part of the shoe upper onto the heel surface of the last, until the shoe upper is completely seated on the last, and is seated in this end position in the correct position and orientation, without distortion and/or without tension in the desired exact position on the last.

The shoe upper can be picked up by the gripper guided by the robot arm, by the robot controller automatically controlling the joints of the robot arm in such a way that the robot arm brings the gripper to a rear cap of the shoe upper, and by the gripper holding the shoe upper by clamping the rear cap of the shoe upper between an inner tongue of the gripper, the inner tongue being in particular automatically adjustable, and a counterpart of the gripper resting on the outer rear part of the shoe upper.

The gripper can have an L-shaped base support which has a short leg 1 and a long leg extending away at right angles thereto. On the short leg of the base support there can be a support surface which is designed to lie flush against a heel surface of the shoe upper when the shoe upper is gripped by the gripper. The long leg can be connected to a force/torque sensor and the force/torque sensor in turn can be attached to the connection flange of the robot arm. On a side of the long leg opposite the force/torque sensor, the base support can have a shoehorn-like inner tongue. The inner tongue in this case is designed to lie against the inside of the rear cap of the shoe upper when the shoe upper is gripped by the gripper, such that when the shoe upper is gripped by the gripper, the rear cap of the shoe upper is clamped between the long leg of the base support and the tongue.

The last onto which the shoe upper is pulled can be arranged in a stationary manner with its sole surface facing upwards.

In the context of an automated series production, the last can be a single last of a plurality of further lasts, such that in the context of series production, a plurality of shoe uppers can be pulled onto a plurality of lasts, for example in order to be able to manufacture a plurality of shoes at the same time or in series at short time intervals.

The specified maximum tensile force that is exerted during the pulling of the shoe upper held by the gripper onto the last, starting at the toe end of the last in the direction of the heel end of the last in the longitudinal extension of the last, can be empirically predetermined as a function of the construction of the shoe upper and/or the type of material and/or the material combination of the shoe upper, before the pulling is carried out.

The prespecified maximum tensile force that is exerted during the pulling of the upper held by the gripper onto the last, starting at the toe end of the last in the direction of the heel end of the last in the longitudinal extension of the last, can be between 100 Newtons and 250 Newtons, in particular between 150 Newtons and 210 Newtons.

The pulling of the shoe upper held by the gripper onto the last in the longitudinal extension of the last can be carried out with a continuously increasing tensile force, up to a maximum of the prespecified maximum tensile force.

Once the prespecified maximum tensile force has been reached, the shoe upper held by the gripper can be pulled further onto the last in the longitudinal extension of the last with a constant tensile force equal to the prespecified maximum tensile force.

While the shoe upper is being pulled in the longitudinal extension of the last, the shoe upper can be pressed onto the last with a pressing force of between 5 and 15 Newtons acting at least substantially perpendicularly on the sole surface of the last.

The shoe upper can be pressed onto the last with a pressing force of between 5 and 15 Newtons acting at least substantially perpendicularly on the sole surface of the last, at least during a sub-portion of the pulling movement on the shoe upper, which sub-portion comprises at least half the length of the longitudinal extension of the last towards the heel surface of the last.

During the pulling and pressing of the shoe upper in the longitudinal extension of the last, the exertion of transverse forces can be prevented by moving the robot arm joints exclusively in the longitudinal extension of the last, by controlling the robot arm joints with force/torque control.

During the pulling and pressing of the shoe upper in the longitudinal extension of the last, the occurrence of transverse forces can be prevented by the gripper making lateral yielding movements in the direction transverse to the longitudinal extension of the last, by the robot controller controlling the joints of the robot arm, in order to reduce the transverse forces at least substantially to zero.

The force/torque-controlled movement can be carried out by feeding measured values from a force/torque sensor arranged between the gripper and a flange of the robot arm to the robot controller for evaluation, and adapting the planned movements of the gripper as a function of the measured values.

Instead of a force/torque sensor arranged between the gripper and a flange of the robot arm, in a modification of the invention, the joint torque sensors of a force/torque-controlled robot arm can also be used in order to be able to use the joint torques of the force/torque-controlled robot arm as measured values, wherein these measured values of the joint torques are supplied to the robot controller for evaluation, and the planned movements of the gripper are adapted as a function of these measured values.

The heel part of the shoe upper can be pulled along the heel end of the last until the shoe upper is completely seated on the last, by the robot controller moving the gripper in at least two, in particular three straight partial movement paths along the heel end of the last.

By moving the gripper in at least two, in particular three straight partial movement paths, the heel part of the shoe upper is pulled over the heel end of the last until the shoe upper is completely seated on the last. At least with regard to this direction of movement, this can take place either in a force/torque-controlled manner or only in a position-controlled manner, i.e., without force/torque control.

The pulling movement for the heel part of the shoe upper along the heel end of the last, until the shoe upper is completely seated on the last, can be carried out by the robot controller moving the gripper in a single, arcuate, and particularly circular-arc-shaped overall movement path along the heel end of the last.

By moving the gripper in a single, arcuate, and particularly circular-arc-shaped overall movement path, the heel part of the shoe upper is pulled over the heel end of the last until the shoe upper is completely seated on the last. At least with regard to this direction of movement, this can take place either in a force/torque-controlled manner, or only in a position-controlled manner, i.e., without force/torque control.

During the pulling of a first shoe upper onto the last, the forces acting during the pulling of the first shoe upper can be detected and stored as force values, wherein, during a subsequent pulling of a further shoe upper onto the last, the stored force values of the pulling of the first shoe upper can be compared with current force values which are measured during the pulling of the further shoe upper onto the last, and when a prespecified maximum deviation of stored force values with respect to current force values is exceeded, the pulling movement is aborted.

By using such stored force values as target values, and measuring the force values of a current pulling movement and using them as actual values, a deviation, in particular in the force curves, can be determined by comparing previous force values, i.e., the target values, with the current force values, i.e., the actual values, and the magnitude of such a deviation can be used either to adapt the control of the robot arm when the method is carried out, in order to approximate the actual values to the target values, or, if the force values are significantly exceeded, the pulling process can be aborted—that is, the robot arm can be halted, and a signal indicating a fault can be generated and output automatically.

A specific embodiment of the invention is explained in more detail in the following description with reference to the accompanying figures. Specific features of this embodiment can represent general features of the invention regardless of the specific context in which they are mentioned, optionally also considered individually or in further combinations.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
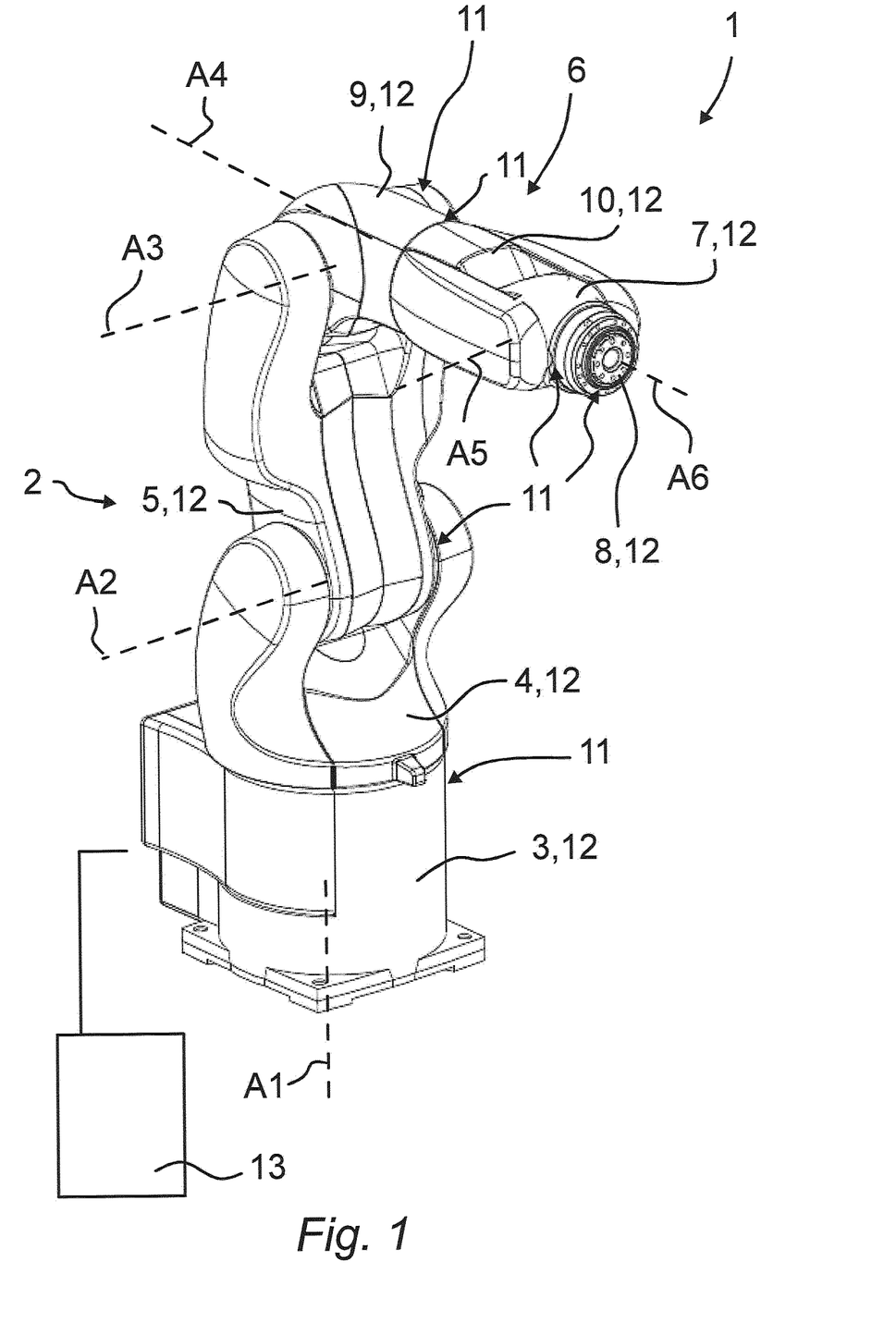
FIG. 1 is a perspective view of a robot arm provided as an example, and of a robot controller which controls the robot arm.

FIG. 1 is a depiction of an industrial robot 1 which comprises a robot arm 2 and a robot controller 13. In the case of the present embodiment, the robot arm 2 comprises a plurality of links 12 which are arranged one after the other and are rotatably connected to one another by means of joints 11. The links 12 are, in particular, a base frame 3 and a carousel 4 that is rotatably mounted relative to the frame 3 about a vertically running axis of rotation A1. The link arm 5 is mounted at the lower end, for example on a pivot bearing head, which is not shown in detail, on the carousel 4 so as to be pivotable about a preferably horizontal axis of rotation A2. The boom arm 6 is in turn mounted on the upper end of the link arm 5 so as to be pivotable about a likewise preferably horizontal axis A3. At its end, the boom arm supports the robot hand 7 with its preferably three axes of rotation A4, A5, A6. In the case of the present embodiment, the boom arm 6 has a base arm 9 which is pivotably mounted on the link arm 5. On the base arm 9, a forearm 10 of the boom arm 6 is rotatably mounted about the axis of rotation A4. In the case of the present embodiment, further links of the robot arm 2 are, in addition to the base frame 3, the carousel 4, the link arm 5 and the base arm 9, as well as the links 12 of the preferably multi-axis robot hand 7, with a fastening device designed as a connecting flange 8 for fastening a gripper 14 for a shoe upper 15, as shown in more detail in FIGS. 2 to 5 and explained below.

The robot arm 2 moving the gripper 14, which automatically pulls the shoe upper 15 onto a last 16, accordingly comprises the base frame 3 in the case of the present embodiment, the carousel 4 rotatably mounted on the base frame 3 by means of a first joint 11 of the robot arm 2 about a first axis of rotation A1, the link arm 5 pivotably mounted on the carousel 4 by means of a second joint 11 of the robot arm 2 about a second axis of rotation A2, the base arm 9 pivotably mounted on the link arm 5 by means of a third joint 11 of the robot arm 2 about a third axis of rotation A3, and the multi-axis robot hand 7 mounted on the base arm 9.

The gripper 14, which is arranged on the connecting flange 8 of the robot arm 2, has in the case of the present embodiment an L-shaped base support 17, which has a short leg 17.1, and a long leg 17.2 extending away at right angles thereto. On the short leg 17.1 of the base support 17 there is a bearing surface 18 which is designed to lie flush against a heel surface of the shoe upper 15 when the shoe upper 15 is gripped by the gripper. The long leg 17.2 is connected to a force/torque sensor 19 and the force/torque sensor 19 is in turn attached to the connection flange 8 of the robot arm 2. On a side of the long leg 17.2 opposite the force/torque sensor 19, the base support 17 comprises a shoehorn-like inner tongue 20. The inner tongue 20 is designed to rest against the inside of the rear cap 15.1 of the shoe upper 15 when the shoe upper 15 is gripped by the gripper, such that the rear cap 15.1 of the shoe upper 15 is clamped between the long leg 17.2 of the base support 17 and the tongue 20 when the shoe upper 15 is gripped by the gripper.

The method according to the invention is used to automatically pull the shoe upper 15 onto the last 16 by means of the robot 1, which comprises the robot controller 13, the robot arm 2 controlled automatically by the robot controller 13, and the gripper 14 moved by the robot arm 2, which is designed to hold the shoe upper 15, as described above by way of example.

Figure 2:
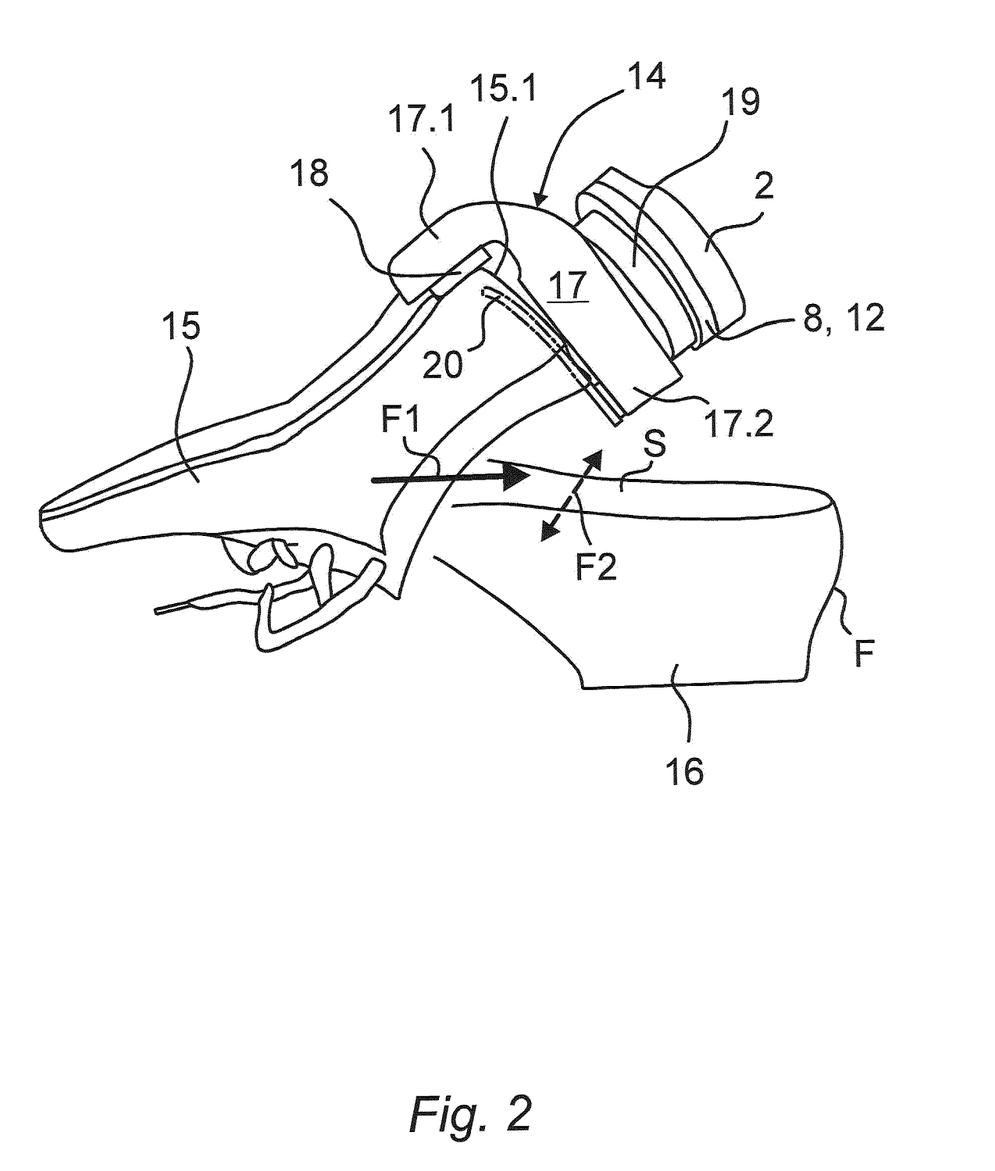
FIG. 2 is a perspective view of a last provided as an example, onto which a shoe upper is pulled, in a first state in which the shoe upper is placed on the toe end of the last.
Figure 3:
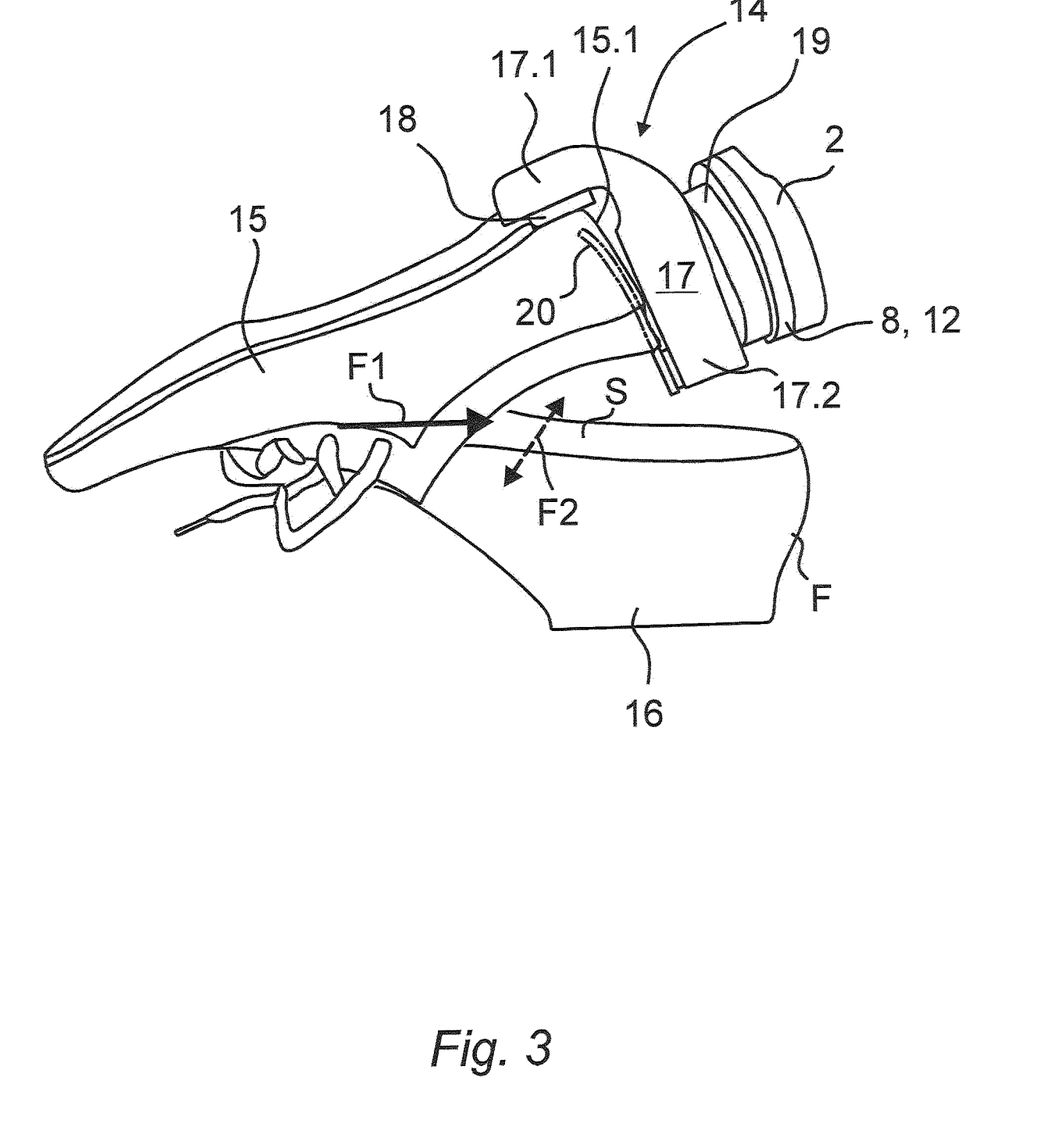
FIG. 3 is a perspective view of a last provided as an example, onto which a shoe upper is pulled, in a second state in which the shoe upper is pulled longitudinally along the last.

As illustrated by FIG. 2, the shoe upper 15 is first picked up by the gripper 14 guided by the robot arm 2 in such a way that the gripper 14 holds the shoe upper 15 in place. Subsequently, the shoe upper 15 held by the gripper 14 is pulled onto the last 16 by the force/torque-controlled movement of the gripper 14, by the motorized controlling of the joints 11 of the robot arm 2, in such a way that the shoe upper 15 is pulled in the longitudinal extension of the last 16 with a prespecified maximum tensile force F1 starting at the toe end of the last 16, in the direction of the heel end of the last 16.

The joints 11 of the robot arm 2 are controlled by the robot controller 13 in such a way that at least during a sub-portion of the pulling movement of the shoe upper 15 in the longitudinal extension of the last 16, the shoe upper 15 is pressed onto the last 16 by a pressing force which acts at least substantially perpendicularly, i.e., in the direction of arrow P1, on the sole surface S of the last 16.

Figure 4:
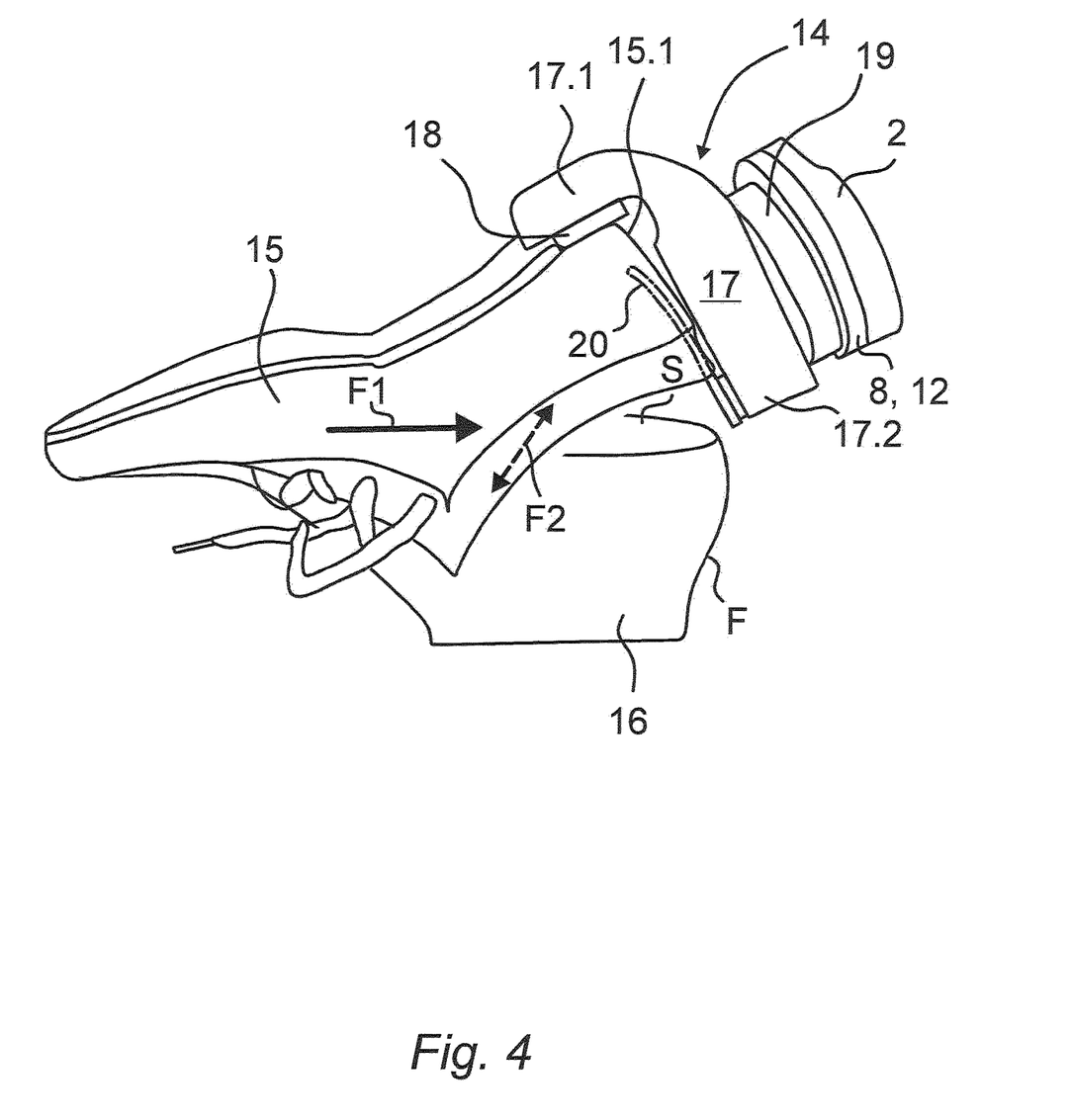
FIG. 4 is a perspective view of a last provided as an example, onto which a shoe upper is pulled, in a third state in which the shoe upper is pressed against the sole surface of the last with a pressing force during the pulling.
Figure 5:
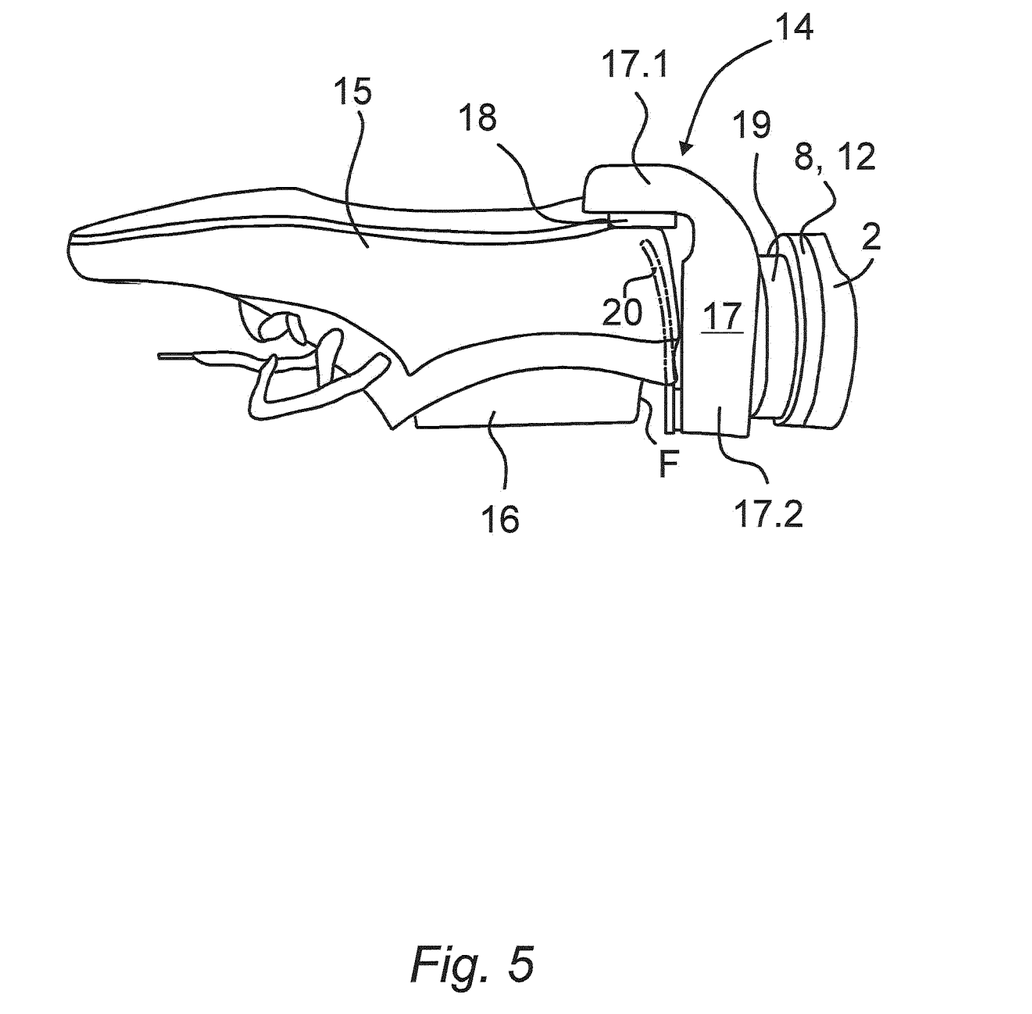
FIG. 5 is a perspective view of a last provided as an example, onto which a shoe upper is pulled, in a fourth state in which the heel part of the shoe upper is pulled over the heel end of the last.

During the pulling and pressing of the shoe upper 15 in the longitudinal extension of the last 16, the shoe upper 15 is pulled onto the last 16 in the longitudinal extension of the last 16, while the creation and exertion of transverse forces F2 is prevented by the force/torque-controlled movement, until the heel part of the shoe upper 15 slides past the transition edge of the sole surface S of the last 16 to the heel surface F of the last 16, as indicated by FIGS. 4 and 5.

After the heel part of the shoe upper 15 has slid over the transition edge of the last 16, the joints 11 of the robot arm 2 are controlled in a modified manner in such a way that the previous tensile force F1 acting in the longitudinal direction from the toe end of the last 16 in the direction of the heel end of the last 16 changes into a pressing force F2 acting in the opposite direction (FIG. 5), which presses the shoe upper 15 against the heel surface F of the last 16, while at the same time the heel part of the shoe upper 15 is pulled along the heel end of the last 16 until the shoe upper 15 is completely seated on the last 16.

The shoe upper 15 can be picked up by the gripper 14 guided by the robot arm 2 by the robot controller 13 automatically controlling the joints 11 of the robot arm 2 in such a way that the robot arm 2 brings the gripper 14 up to the rear cap 15.1 of the shoe upper 15, and the gripper 14 holds the upper 15 in place by clamping the rear cap 15.1 of the upper 15 between an inner tongue 20, which is in particular automatically adjustable, of the gripper 14 and a counterpart, i.e., the long leg 17.2 of the gripper 14 resting on the outer rear part of the upper 15.

In the case of the present embodiment, the last 16 onto which the shoe upper 15 is pulled is arranged in a stationary manner with its sole surface S facing upward, as is shown in FIGS. 2 to 5.

The prespecified maximum tensile force that is exerted during the pulling of the shoe upper 15 held by the gripper 14 onto the last 16, starting at the toe end of the last 16 in the direction of the heel end of the last 16 in the longitudinal extension of the last 16, is empirically predetermined before the pulling is carried out as a function of the construction of the shoe upper 15 and/or the type of material and/or material combination of the shoe upper 15.

The prespecified maximum tensile force that is exerted during the pulling of the shoe upper 15 held by the gripper 14 onto the last 16, starting at the toe end of the last 16, in the direction of the heel end of the last 16 in the longitudinal extension of the last 16, can be a value between 100 Newtons and 250 Newtons, in particular between 150 Newtons and 210 Newtons.

The pulling of the shoe upper 15 held by the gripper 14 onto the last 16 in the longitudinal extension of the last 16 can be carried out with a continuously increasing tensile force up to, at most, the prespecified maximum tensile force.

After the prespecified maximum tensile force has been reached, in the case of the present embodiment the shoe upper 15 held by the gripper 14 is pulled further onto the last 16 in the longitudinal extension of the last 16 with a constant tensile force equal to the prespecified maximum tensile force.

While the shoe upper 15 is being pulled in the longitudinal extension of the last 16, the shoe upper 15 is pressed onto the last 16 with a pressing force of between 5 and 15 Newtons acting at least substantially perpendicularly on the sole surface S of the last 16.

The shoe upper 15 is pressed onto the last 16 with a pressing force of between 5 and 15 Newtons acting at least substantially perpendicularly on the sole surface S of the last 16, at least during a sub-portion of the pulling movement on the shoe upper 15, which sub-portion comprises at least half the length of the longitudinal extension of the last 16 facing the heel surface F of the last 16.

During the pulling and pressing of the shoe upper 15 in the longitudinal extension of the last 16, the exertion of transverse forces is prevented by the gripper 14 being moved exclusively in the longitudinal extension of the last 16 by the force/torque-controlled controlling of the joints 11 of the robot arm 2 by the robot controller 13.

At the same time, during the pulling and pressing of the shoe upper 15 in the longitudinal extension of the last 16, the creation of transverse forces can be prevented by the fact that the gripper 14 performs lateral yielding movements in a direction transverse to the longitudinal extension of the last 16, by the force/torque-controlled movement of the joints 11 of the robot arm 1, by the robot controller 13, to at least substantially reduce the transverse forces to zero.

The force/torque-controlled movement is carried out according to the invention in that measured values of a force/torque sensor 19 arranged between the gripper 14 and the flange 8 of the robot arm 2 are supplied to the robot controller 13 for evaluation, and the planned movements of the gripper 14 are adapted as a function of the measured values.

The pulling of the heel part of the shoe upper 15 along the heel end of the last 16 until the shoe upper 15 is completely seated on the last 16, as shown in FIG. 5, is carried out by the robot controller 13 moving the gripper 14 in at least two, in particular three straight partial movement paths T1, T2, T3 along the heel end of the last 16.

Instead of using straight partial movement paths T1, T2, T3, the heel part of the shoe upper 15 can alternatively be pulled along the heel end of the last 16 until the shoe upper 15 is completely seated on the last 16 by the robot controller 13 moving the gripper 14 in a single, arcuate, particularly circular-arc-shaped overall movement path G along the heel end of the last 16.

While a first shoe upper 15 is being pulled onto the last 16, the forces acting during the pulling of the first shoe upper 15 are detected and stored as force values, and during a subsequent pulling of a further shoe upper 15 onto the last 16, the stored force values of the pulling of the first shoe upper 15 are compared with current force values which are measured during the pulling of the further shoe upper 15 onto the last 16, and if a specified maximum deviation between the stored force values and the current force values is exceeded, the pulling movement is aborted.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A method for automatically pulling a shoe upper onto a last using a robot, the robot comprising a robot controller, a robot arm automatically controlled by the robot controller, and a gripper which is moved by the robot arm and which is configured to hold a shoe upper, the method comprising:
   picking up the shoe upper with the gripper, guided by the robot arm, such that the gripper holds the shoe upper;
   pulling the shoe upper with the gripper onto the last by a force/torque-controlled movement of the gripper through motorized control of joints of the robot arm such that the shoe upper is pulled, starting at a toe end of the last, in a longitudinal extension of the last in a direction of a heel end of the last and with a prespecified maximum tensile force;
   controlling the joints of the robot arm with the robot controller such that at least during a portion of the pulling of the shoe upper in the longitudinal extension of the last, the shoe upper is pressed onto the last with a pressing force acting at least substantially perpendicularly on the sole surface of the last;
   wherein, during the pulling and the pressing of the shoe upper in the longitudinal extension of the last, the shoe upper is pulled onto the last by the force/torque-controlled movement in the longitudinal extension of the last, while preventing the creation and exertion of transverse forces, until the heel part of the shoe upper slides past a transition edge of the sole surface of the last and up to the heel surface of the last; and
   once the heel part of the shoe upper has slid past the transition edge of the last, controlling the joints of the robot arm with the robot controller such that the tensile force previously acting longitudinally from the toe end of the last in the direction of the heel end of the last is changed into a compressive force acting in the opposite direction, which compressive force presses the shoe upper against the heel surface of the last while at the same time, the heel part of the shoe upper is pulled up along the heel end of the last until the shoe upper rests completely on the last.

2. The method of claim 1, wherein picking up the shoe upper with the gripper comprises:
   moving the gripper with the robot arm to a rear cap of the shoe upper; and
   clamping the shoe upper with the gripper by holding the rear cap of the shoe upper between an inner tongue of the gripper and a counterpart of the gripper which engages the outer rear part of the shoe upper.

3. The method of claim 2, wherein the inner tongue of the gripper is automatically adjustable to clamp the rear cap of the shoe upper.

4. The method of claim 1, further comprising arranging the last in a stationary manner with its sole surface facing upwards.

5. The method of claim 1, wherein the prespecified maximum tensile force is empirically predetermined before the pulling is carried out, as a function of at least one of:
   the construction of the shoe upper;
   the type of material; or
   a material combination of the shoe upper.

6. The method of claim 1, wherein the prespecified maximum tensile force is set to a value between 100 Newtons and 250 Newtons.

7. The method of claim 6, wherein the prespecified maximum tensile force is set to a value between 150 Newtons and 210 Newtons.

8. The method of claim 1, wherein pulling the upper with the gripper onto the last comprises pulling the upper with a continuously increasing tensile force up to, at most, the specified maximum tensile force.

9. The method of claim 8, further comprising:
   continued pulling of the upper with the gripper onto the last in the longitudinal extension of the last once the prespecified maximum tensile force has been reached.

10. The method of claim 9, wherein continued pulling of the upper comprises pulling the upper with a constant tensile force having a magnitude equal to the specified maximum tensile force.

11. The method of claim 1, wherein the pressing force acting at least substantially perpendicularly on the sole surface of the last is between 5 Newtons and 15 Newtons.

12. The method of claim 1, wherein:
   pressing the shoe upper onto the last by a pressing force acting at least substantially perpendicularly on the sole surface of the last comprises pressing the shoe upper with a pressing force of between 5 Newtons and 15 Newtons; and
   the sub-portion of the pulling comprises pulling along at least half the length of the longitudinal extension of the last facing the heel surface of the last.

13. The method of claim 1, wherein preventing the exertion of transverse forces during the pulling and pressing of the shoe upper comprises moving the gripper exclusively in the longitudinal extension of the last by the force/torque control of the joints of the robot arm with the robot controller.

14. The method of claim 1, wherein the creation of transverse forces during the pulling and pressing of the shoe upper is prevented by performing lateral yielding movements of the gripper by the force/torque-controlled controlling of the joints of the robot arm, in a direction transverse to the longitudinal extension of the last, to at least substantially reduce the transverse forces to zero.

15. The method of claim 1, further comprising:
   providing to the robot controller for evaluation, measured values of forces associated with pulling the shoe upper and obtained from a force/torque sensor arranged between the gripper and a flange of the robot arm; and
   adapting the planned movements of the gripper as a function of the measured values.

16. The method of claim 1, wherein pulling the heel part of the shoe upper along the heel end of the last until the shoe upper rests completely on the last comprises moving the gripper with the robot controller in at least two partial movement paths along the heel end of the last.

17. The method of claim 16, wherein pulling the heel part of the shoe upper along the heel end of the last comprises moving the gripper with the robot controller in three straight, partial movement paths along the heel end of the last.

18. The method of claim 1, wherein pulling the heel part of the shoe upper along the heel end of the last until the shoe upper rests completely on the last comprises moving the gripper with the robot controller in a single, arcuate overall movement path along the heel end of the last.

19. The method of claim 18, wherein the arcuate overall movement path is a circular-arc-shaped overall movement path.

20. The method of claim 1, further comprising:
   detecting and storing force values of the forces acting during the pulling of a first shoe upper onto the last;
   removing the first shoe upper from the last;
   comparing the stored force values with current force values detected during the pulling of a second shoe upper onto the last; and
   aborting the pulling movement of the second shoe upper in response to exceeding a specified maximum deviation between the stored force values and the current force values.

* * * * *